US009740473B2

(12) United States Patent
Kumar et al.

(10) Patent No.: US 9,740,473 B2
(45) Date of Patent: Aug. 22, 2017

(54) SOFTWARE AND ASSOCIATED HARDWARE REGRESSION AND COMPATIBILITY TESTING SYSTEM

(71) Applicant: Bank of America Corporation, Charlotte, NC (US)

(72) Inventors: Amit Kumar, Haryana (IN); Vivek Kumar, New Delhi (IN); Hitendra Kumar, Uttar Pradesh (IN); Purushottam Baghel, Uttar Pradesh (IN)

(73) Assignee: Bank of America Corporation, Charlotte, NC (US)

( * ) Notice: Subject to any disclaimer, the term of this patent is extended or adjusted under 35 U.S.C. 154(b) by 93 days.

(21) Appl. No.: 14/836,215

(22) Filed: Aug. 26, 2015

(65) Prior Publication Data
US 2017/0060560 A1 Mar. 2, 2017

(51) Int. Cl.
G06F 9/44 (2006.01)
G06F 9/445 (2006.01)
G06F 11/36 (2006.01)

(52) U.S. Cl.
CPC ............ *G06F 8/65* (2013.01); *G06F 11/3688* (2013.01); *G06F 8/61* (2013.01); *G06F 8/71* (2013.01); *G06F 9/44589* (2013.01)

(58) Field of Classification Search
CPC ..... G06F 8/61; G06F 8/65; G06F 8/71; G06F 9/44589
See application file for complete search history.

(56) References Cited

U.S. PATENT DOCUMENTS 5,367,686 A  11/1994 Fisher et al.
6,006,035 A  12/1999 Nabahi
(Continued)

FOREIGN PATENT DOCUMENTS

EP    1096445    5/2001

OTHER PUBLICATIONS

Sebastian Ronnau et al., Merging Changes in XML Documents Using Reliable Context Fingerprints, DocENG '08, ACM, New York, NY, pp. 52-61.
(Continued)

*Primary Examiner* — Lewis A Bullock, Jr.
*Assistant Examiner* — Tina Huynh
(74) *Attorney, Agent, or Firm* — Michael A. Springs; Moore & Van Allen PLLC; Peter B. Stewart

(57) ABSTRACT

The present disclosure describes testing regression and compatibility of software and associated hardware. Embodiments herein disclosed receive an indication from a user to test the regression and the compatibility of proposed software; access software files related to installation of the proposed software; present a verification interface to the user, wherein the verification interface includes various validation functions for validating entries created or updated along with the proposed software being installed or uninstalled, such as a registry entry, a log file entry, an Add or Remove Programs entry, and the like, wherein when each of the validation functions is selected, the system automatically determines if the corresponding entry for installation or uninstallation of the proposed software is successful. Embodiments herein disclosed further receive an indication from the user for selection of the validation functions and present to the user an indication of success of the validation of the entries.

14 Claims, 4 Drawing Sheets

(56) References Cited

U.S. PATENT DOCUMENTS

| | | | |
|---|---|---|---|
| 6,161,218 A | 12/2000 | Taylor | |
| 6,199,204 B1 | 3/2001 | Donohue | |
| 6,266,811 B1 | 7/2001 | Nabahi | |
| 6,330,715 B1 | 12/2001 | Razzaghe-Ashrafi | |
| 6,389,433 B1 | 5/2002 | Bolosky et al. | |
| 6,430,738 B1 | 8/2002 | Gross et al. | |
| 6,434,744 B1 | 8/2002 | Chamberlain et al. | |
| 6,434,745 B1 | 8/2002 | Conley, Jr. et al. | |
| 6,453,469 B1 | 9/2002 | Jystad | |
| 6,626,357 B1 | 9/2003 | Ross | |
| 6,775,829 B1 | 8/2004 | Kroening | |
| 6,836,859 B2 | 12/2004 | Berg | |
| 6,857,011 B2 | 2/2005 | Reinke | |
| 6,968,321 B1 | 11/2005 | Yu | |
| 6,981,252 B1 | 12/2005 | Sadowsky | |
| 7,017,144 B2 | 3/2006 | Cohen et al. | |
| 7,024,581 B1 | 4/2006 | Wang et al. | |
| 7,093,246 B2 | 8/2006 | Brown et al. | |
| 7,131,123 B2 | 10/2006 | Suorsa et al. | |
| 7,171,659 B2 | 1/2007 | Becker et al. | |
| 7,181,731 B2 | 2/2007 | Pace et al. | |
| 7,184,759 B2 | 2/2007 | Date et al. | |
| 7,251,812 B1 | 7/2007 | Jhanwar et al. | |
| 7,330,967 B1 | 2/2008 | Pujare et al. | |
| 7,356,679 B1 | 4/2008 | Le et al. | |
| 7,411,821 B2 | 8/2008 | Rudelic | |
| 7,448,034 B2 | 11/2008 | Anderson et al. | |
| 7,461,095 B2 | 12/2008 | Cohen et al. | |
| 7,478,381 B2 | 1/2009 | Roberts et al. | |
| 7,509,636 B2 | 3/2009 | McGuire et al. | |
| 7,536,684 B2 | 5/2009 | Patrizio et al. | |
| 7,536,687 B1 | 5/2009 | Myers | |
| 7,537,156 B2 | 5/2009 | Singer-Harter | |
| 7,546,594 B2 | 6/2009 | McGuire et al. | |
| 7,562,348 B1 | 7/2009 | King | |
| 7,574,706 B2 | 8/2009 | Meulemans et al. | |
| 7,600,021 B2 | 10/2009 | Schottland et al. | |
| 7,613,770 B2 | 11/2009 | Li | |
| 7,676,448 B2 | 3/2010 | Henderson et al. | |
| 7,711,706 B2 | 5/2010 | Manapetty et al. | |
| 7,716,373 B2 | 5/2010 | Hamanaka et al. | |
| 7,716,660 B2 | 5/2010 | Mackay | |
| 7,730,480 B2 | 6/2010 | Isaacson | |
| 7,757,228 B1 | 7/2010 | Eatough et al. | |
| 7,770,164 B2 | 8/2010 | Schuelein et al. | |
| 7,814,476 B2 | 10/2010 | Ho | |
| 7,840,957 B2 | 11/2010 | Kumashiro et al. | |
| 7,849,462 B2 | 12/2010 | Traut et al. | |
| 7,870,547 B2 | 1/2011 | Schuft et al. | |
| 7,886,292 B2 | 2/2011 | Leung et al. | |
| 7,930,371 B2 | 4/2011 | Furuyama et al. | |
| 7,975,007 B2 | 7/2011 | Reistad et al. | |
| 7,987,459 B2 | 7/2011 | Chow et al. | |
| 8,037,243 B1 | 10/2011 | Gasser et al. | |
| 8,055,096 B2 | 11/2011 | Dahms et al. | |
| 8,069,343 B2 | 11/2011 | Concorso | |
| 8,091,117 B2 | 1/2012 | Williams et al. | |
| 8,112,505 B1 | 2/2012 | Ben-Shaul et al. | |
| 8,135,830 B2 | 3/2012 | McClure et al. | |
| 8,156,485 B2 | 4/2012 | Jordan, III et al. | |
| 8,176,153 B2 | 5/2012 | Bose | |
| 8,176,482 B1 | 5/2012 | Felix | |
| 8,191,044 B1* | 5/2012 | Berlik | G06F 11/3672 717/102 |
| 8,245,070 B2 | 8/2012 | Finkelstein et al. | |
| 8,286,158 B2 | 10/2012 | Hamid et al. | |
| 8,316,364 B2 | 11/2012 | Stein | |
| 8,387,037 B2 | 2/2013 | Henseler et al. | |
| 8,397,230 B2 | 3/2013 | Ewington et al. | |
| 8,429,639 B2 | 4/2013 | Jirka | |
| 8,615,752 B2 | 12/2013 | Izard et al. | |
| 8,640,117 B2 | 1/2014 | Sugimoto | |
| 8,671,402 B2 | 3/2014 | McCurdy et al. | |
| 8,826,240 B1* | 9/2014 | Lachwani | G06F 8/30 714/38.1 |
| 8,997,077 B1 | 3/2015 | Connolly | |
| 2002/0016956 A1 | 2/2002 | Fawcett | |
| 2002/0047856 A1 | 4/2002 | Baker | |
| 2002/0087960 A1 | 7/2002 | Hisatake | |
| 2002/0100037 A1 | 7/2002 | Kitagawa | |
| 2003/0182411 A1 | 9/2003 | Wang et al. | |
| 2003/0217005 A1 | 11/2003 | Drummond et al. | |
| 2003/0233363 A1 | 12/2003 | Cohen et al. | |
| 2004/0015953 A1 | 1/2004 | Vincent | |
| 2004/0076043 A1 | 4/2004 | Boals et al. | |
| 2004/0088694 A1 | 5/2004 | Ho | |
| 2004/0117414 A1 | 6/2004 | Braun et al. | |
| 2004/0117785 A1 | 6/2004 | Kincaid | |
| 2004/0145766 A1 | 7/2004 | Sugishita et al. | |
| 2004/0148303 A1 | 7/2004 | McKay et al. | |
| 2004/0210362 A1 | 10/2004 | Larson et al. | |
| 2005/0022178 A1 | 1/2005 | Ghafoor et al. | |
| 2005/0050538 A1 | 3/2005 | Kawamata et al. | |
| 2005/0055688 A1 | 3/2005 | Barajas et al. | |
| 2005/0066324 A1 | 3/2005 | Delgado et al. | |
| 2005/0132348 A1 | 6/2005 | Meulemans et al. | |
| 2005/0132349 A1 | 6/2005 | Roberts et al. | |
| 2005/0132357 A1 | 6/2005 | Shell et al. | |
| 2005/0132359 A1 | 6/2005 | McGuire et al. | |
| 2005/0132382 A1 | 6/2005 | McGuire et al. | |
| 2005/0149925 A1 | 7/2005 | Pichetti et al. | |
| 2005/0210459 A1 | 9/2005 | Henderson et al. | |
| 2005/0228798 A1 | 10/2005 | Shepard et al. | |
| 2005/0289533 A1 | 12/2005 | Wang et al. | |
| 2006/0010435 A1 | 1/2006 | Jhanwar et al. | |
| 2006/0020938 A1 | 1/2006 | Elcock et al. | |
| 2006/0026590 A1 | 2/2006 | Berenberg et al. | |
| 2006/0048129 A1 | 3/2006 | Napier et al. | |
| 2006/0080653 A1 | 4/2006 | Siwatu et al. | |
| 2006/0083173 A1 | 4/2006 | Jordan et al. | |
| 2006/0112113 A1 | 5/2006 | Gu et al. | |
| 2006/0123032 A1 | 6/2006 | Manapetty et al. | |
| 2006/0123409 A1 | 6/2006 | Jordan, III et al. | |
| 2006/0123410 A1 | 6/2006 | Kapoor | |
| 2006/0130017 A1 | 6/2006 | Cohen et al. | |
| 2006/0130037 A1 | 6/2006 | Mackay | |
| 2006/0130046 A1 | 6/2006 | O'Neill | |
| 2006/0161811 A1 | 7/2006 | Welts | |
| 2006/0174300 A1 | 8/2006 | Gu et al. | |
| 2006/0195816 A1 | 8/2006 | Grandcolas et al. | |
| 2006/0265471 A1 | 11/2006 | Pitzel et al. | |
| 2007/0015499 A1 | 1/2007 | Vikse et al. | |
| 2007/0028229 A1 | 2/2007 | Knatcher | |
| 2007/0079373 A1 | 4/2007 | Gassoway | |
| 2007/0101328 A1 | 5/2007 | Baron et al. | |
| 2007/0168348 A1 | 7/2007 | Forsyth | |
| 2007/0192630 A1 | 8/2007 | Crane et al. | |
| 2007/0244999 A1 | 10/2007 | Hamanaka et al. | |
| 2007/0274598 A1 | 11/2007 | Dahms et al. | |
| 2008/0005733 A1 | 1/2008 | Ramachandran et al. | |
| 2008/0052704 A1 | 2/2008 | Wysocki | |
| 2008/0077944 A1 | 3/2008 | Seely | |
| 2008/0127175 A1 | 5/2008 | Naranjo et al. | |
| 2008/0209143 A1 | 8/2008 | Takahashi | |
| 2008/0209413 A1 | 8/2008 | Kakumani et al. | |
| 2008/0229284 A1* | 9/2008 | Castro | G06F 11/3688 717/124 |
| 2008/0244068 A1 | 10/2008 | Iyoda et al. | |
| 2008/0250405 A1 | 10/2008 | Farhangi et al. | |
| 2009/0007093 A1 | 1/2009 | Lin | |
| 2009/0047856 A1 | 2/2009 | Farrell et al. | |
| 2009/0053267 A1 | 2/2009 | Kim et al. | |
| 2009/0064108 A1 | 3/2009 | De Atley et al. | |
| 2009/0106753 A1 | 4/2009 | Wang et al. | |
| 2009/0204785 A1 | 8/2009 | Yates, Jr. et al. | |
| 2009/0249324 A1 | 10/2009 | Brar et al. | |
| 2009/0271507 A1 | 10/2009 | Kodimer | |
| 2010/0017793 A1 | 1/2010 | Grover et al. | |
| 2010/0031244 A1 | 2/2010 | Koba | |
| 2010/0048296 A1 | 2/2010 | Adiraju | |
| 2010/0153941 A1 | 6/2010 | Borissov et al. | |
| 2010/0205594 A1 | 8/2010 | Jirka | |
| 2010/0325622 A1 | 12/2010 | Morton | |
| 2011/0030062 A1 | 2/2011 | Hsu et al. | |

(56) References Cited

U.S. PATENT DOCUMENTS

| | | | |
|---|---|---|---|
| 2011/0072421 A1 | 3/2011 | Parry et al. | |
| 2011/0113421 A1 | 5/2011 | Ewington et al. | |
| 2011/0113422 A1 | 5/2011 | Ewington et al. | |
| 2011/0113424 A1 | 5/2011 | Ewington et al. | |
| 2011/0145653 A1* | 6/2011 | Broadfoot | G06F 11/3604 714/38.1 |
| 2011/0173457 A1 | 7/2011 | Reh | |
| 2011/0225577 A1 | 9/2011 | Wookey | |
| 2011/0307860 A1* | 12/2011 | Park | G06F 8/30 717/107 |
| 2013/0014084 A1* | 1/2013 | Sahibzada | G06F 11/368 717/124 |
| 2013/0080999 A1* | 3/2013 | Yang | G06F 11/3664 717/124 |
| 2013/0326471 A1* | 12/2013 | Nucci | G06F 8/10 717/105 |
| 2016/0154729 A1* | 6/2016 | Prodan | G06F 8/437 717/124 |
| 2016/0378521 A1* | 12/2016 | Bektas | G06F 9/45558 718/1 |

OTHER PUBLICATIONS

Patch Management Solution 6.2 for Windows, 2007, ALTRIS, Inc., pp. 31-55.

Nico Sienaert, OSD in Configuration Manager 2007, OSD with SCCM 2007, pp. 1-160.

Christos Gkantsidis et al., Planet Scale Software Updates, SIGCOMM '06, Sep. 11-15, 2006, Pisa, Italy, pp. 423-428.

* cited by examiner

SOFTWARE AND ASSOCIATED HARDWARE REGRESSION AND COMPATIBILITY TESTING SYSTEM

FIELD OF THE INVENTION

This disclosure generally relates to testing regression and compatibility of software and associated hardware.

BACKGROUND

The vast computer industry today produces constantly new and upgraded software aimed to make our computers to perform better, faster and more effectively. Release of new or upgraded software to an operation environment of an enterprise without testing the software prior to release or without knowing the consequences of running the software can pose risks to the operation environment. Thus, it has become an industry or enterprise standard to test regression and compatibility of new or upgraded software with other software and associated hardware before releasing it for use. Regression and compatibility testing on new or upgraded software typically entails installation of the software, manual validation of entries created or modified with the software being installed, uninstallation of the software, and manual validation again of the entries to confirm they are reset properly. Such testing is time-consuming and laborious, especially in the stage of manual validation and especially when the testing is to be done in multiple domains and on various computer platforms.

SUMMARY OF INVENTION

The following presents a summary of certain embodiments of the present invention. This summary is not intended to be a comprehensive overview of all contemplated embodiments, and is not intended to identify key or critical elements of all embodiments nor delineate the scope of any or all embodiments. Its sole purpose is to present certain concepts and elements of one or more embodiments in a summary form as a prelude to the more detailed description that follows.

Methods, systems, and computer program products are described herein that provide for testing regression and compatibility of software and associated hardware.

Some embodiments characterize a system for testing regression and compatibility of software and associated hardware, which includes one or more memory devices having computer readable program code stored thereon and one or more processing devices operatively coupled to the one or more memory devices. The processing devices are configured to execute the computer readable program code to 1) receive an indication from a user to test the regression and the compatibility of proposed software with other software and associated hardware, wherein the indication is a reference to the proposed software being changed; 2) access software files related to installation of the proposed software, wherein the proposed software has been installed or uninstalled on or from a virtual system in order to test the regression and the compatibility of the software with other software and associated hardware; and 3) present a verification interface to the user on the user computer system, wherein the verification interface includes a registry key validation function, a log file validation function, an Add or Remove Programs (ARP) validation function and a dependency validation function, wherein when each of the validation functions is selected, the system automatically determines if the corresponding entry for installation or uninstallation of the proposed software is successful. The processing devices are further configured to execute the computer readable program code to receive an indication from the user for selection of one or more of the validation functions; and present an indication of success of the validation of the registry key, the log file, the ARP entry, or the dependency to the user on the user computer system.

Some embodiments feature a computer implemented method for testing regression and compatibility of software and associated hardware. The method performs multiple steps, all via a processing device, including: 1) receiving an indication from a user to test the regression and the compatibility of proposed software with other software and associated hardware, wherein the indication is a reference to the proposed software being changed; 2) accessing software files related to installation of the proposed software, wherein the proposed software has been installed or uninstalled on or from a virtual system in order to test the regression and the compatibility of the software with other software and associated hardware; and 3) presenting a verification interface to the user on the user computer system, wherein the verification interface includes a registry key validation function, a log file validation function, an ARP validation function and a dependency validation function, wherein when each of the validation functions is selected, the system automatically determines if the corresponding entry for installation or uninstallation of the proposed software is successful. The method further includes receiving an indication from the user for selection of one or more of the validation functions; and presenting an indication of success of the validation of the registry key, the log file, the ARP entry, or the dependency to the user on the user computer system.

Further embodiments provide a computer program product for testing regression and compatibility of software and associated hardware, which includes a non-transitory computer readable medium including computer readable instructions. The computer readable instructions include instructions for 1) receiving an indication from a user to test the regression and the compatibility of proposed software with other software and associated hardware, wherein the indication is a reference to the proposed software being changed; 2) accessing software files related to installation of the proposed software, wherein the proposed software has been installed or uninstalled on or from a virtual system in order to test the regression and the compatibility of the software with other software and associated hardware; and 3) presenting a verification interface to the user on the user computer system, wherein the verification interface includes a registry key validation function, a log file validation function, an ARP validation function and a dependency validation function, wherein when each of the validation functions is selected, the system automatically determines if the corresponding entry for installation or uninstallation of the proposed software is successful. The computer readable instructions further include instructions for receiving an indication from the user for selection of one or more of the validation functions; and presenting an indication of success of the validation of the registry key, the log file, the ARP entry, or the dependency to the user on the user computer system.

Implementations may include one or more of the following features.

In some implementations, the one or more processing devices are further configured to execute the computer readable program code to install the proposed software onto a virtual test computer.

In some implementations, the verification interface further includes an open record function, wherein when the open record function is selected, the system creates and stores the results of the testing of the regression and compatibility of software and associated hardware.

In some implementations, the verification interface further includes a purpose function, wherein when the purpose function is selected, the system receives an indication of the purpose of the proposed software.

In some implementations, the verification interface further includes an upgrade check function, wherein when the upgrade check function is selected, the system checks a previous software version registry key to determine if the previous software version was installed before the proposed software was installed.

In some implementations, the verification interface further includes a shortcut test function, wherein when the shortcut test function is selected, the system determines and displays a default path of the proposed software shortcuts.

In some implementations, the verification interface further includes an installation summary function, wherein when the installation summary function is selected, the system determines and displays test results for the testing of the proposed software.

In some implementations, the verification interface is utilized to test both the installation and uninstallation of the proposed software on multiple domains and on multiple platforms.

To the accomplishment of the foregoing and related objectives, the embodiments of the present invention comprise the function and features hereinafter described. The following description and the referenced figures set forth a detailed description of the present invention, including certain illustrative examples of the one or more embodiments. The functions and features described herein are indicative, however, of but a few of the various ways in which the principles of the present invention may be implemented and used and, thus, this description is intended to include all such embodiments and their equivalents.

The features, functions, and advantages that have been discussed may be achieved independently in various embodiments of the invention or may be combined with yet other embodiments, further details of which can be seen with reference to the following description and drawings.

BRIEF DESCRIPTION OF THE DRAWINGS

Figure 1:
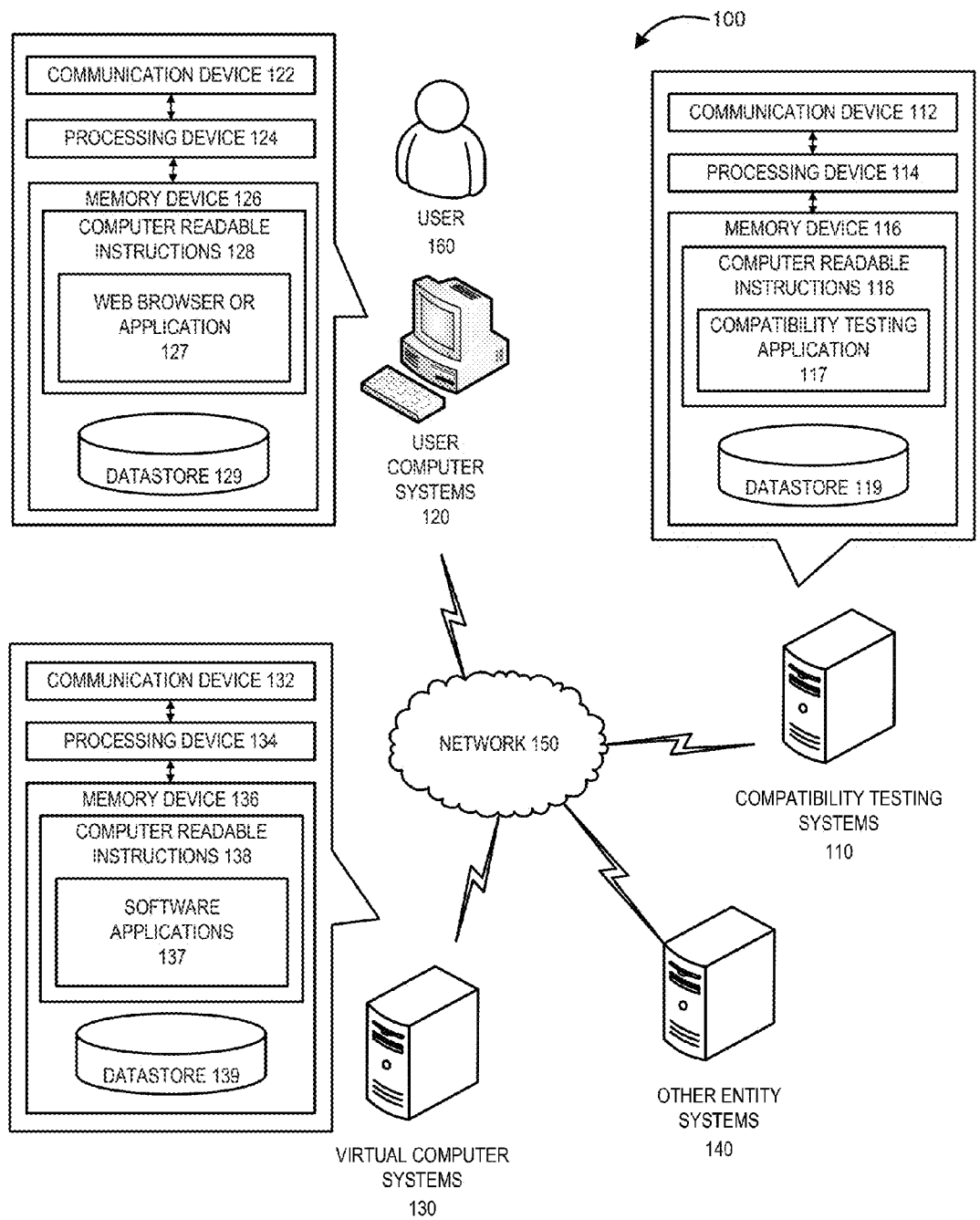
Figure 2:
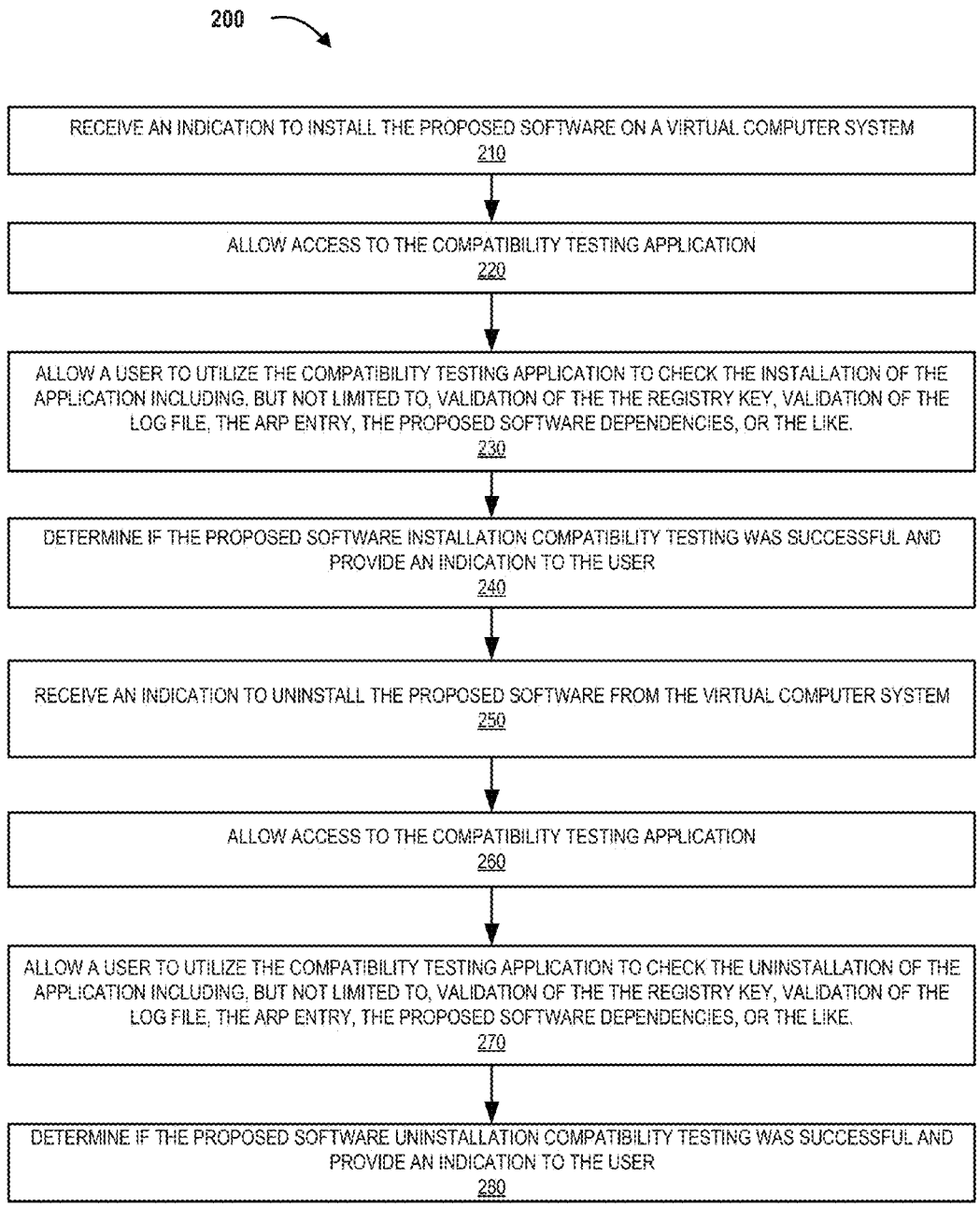
Figure 3:
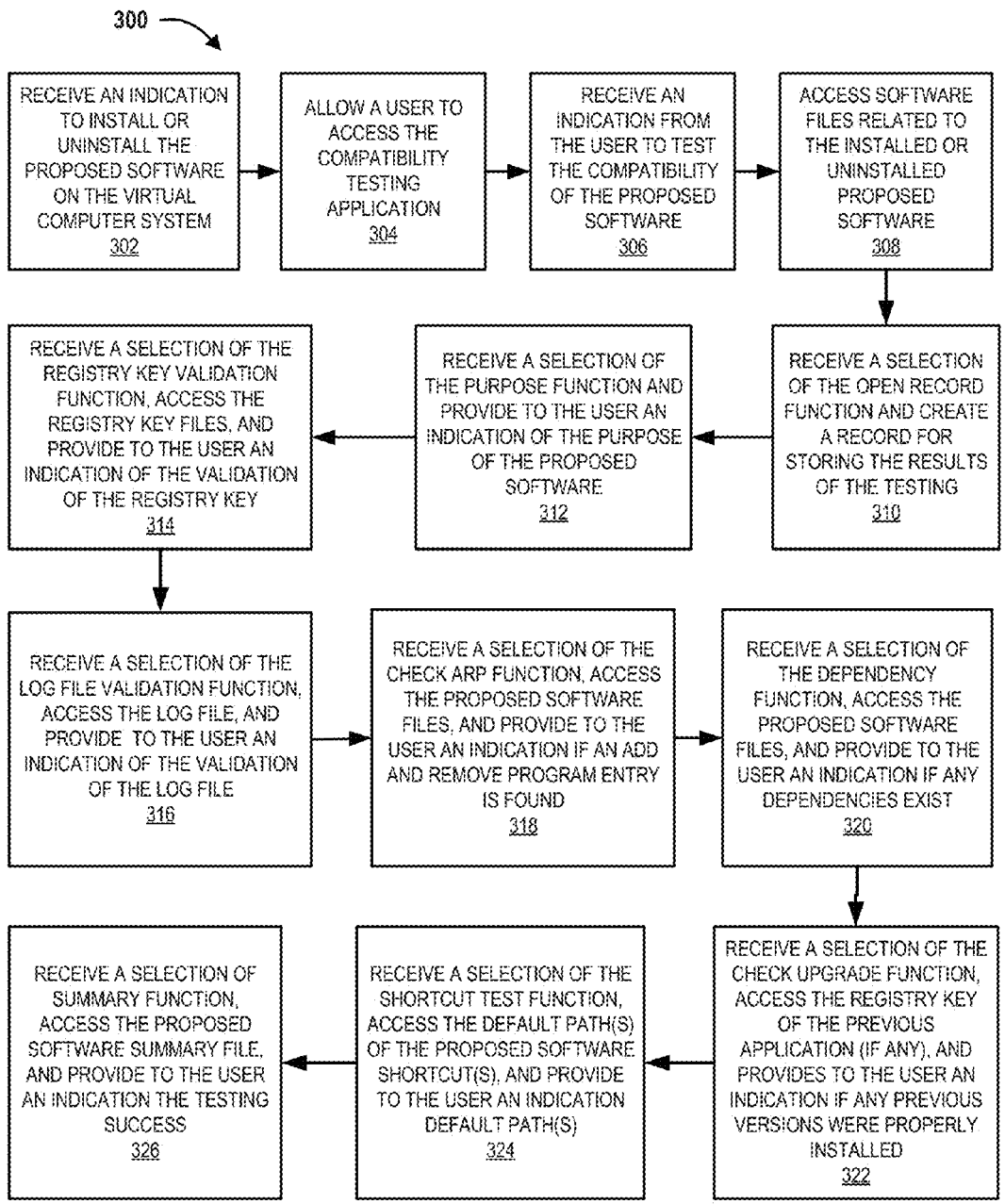
Figure 4:
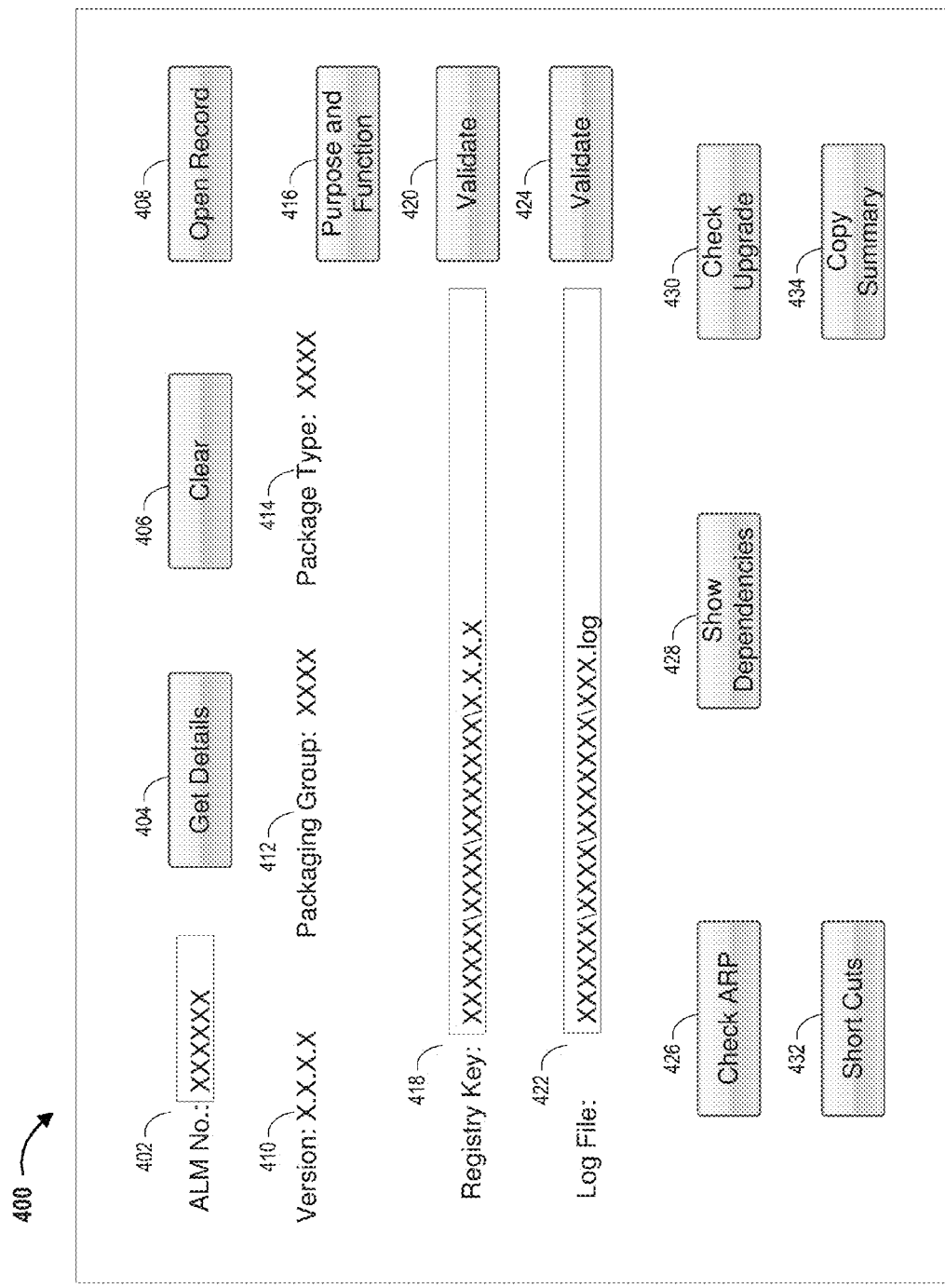

Having thus described embodiments of the invention in general terms, reference will now be made to the accompanying drawings, which are not necessarily drawn to scale, and wherein:

FIG. 1 is a block diagram illustrating a system environment for testing regression and compatibility of new or upgraded software and associated hardware, in accordance with an embodiment of the invention;

FIG. 2 is a flowchart illustrating a general process for testing regression and compatibility of new or upgraded software and associated hardware, in accordance with an embodiment of the invention;

FIG. 3 is a flowchart illustrating another general process for testing regression and compatibility of new or upgraded software and associated hardware, in accordance with an embodiment of the present invention; and FIG. 4 is an exemplary user interface for testing regression and compatibility of new or upgraded software and associated hardware, in accordance with embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Various embodiments or features will be presented in terms of systems that may include a number of devices, components, modules, and the like. It is to be understood and appreciated that the various systems may include additional devices, components, modules, and the like, and/or may not include all of the devices, components, modules, and the like discussed in connection with the figures. A combination of these approaches may also be used.

The steps and/or actions of a method or algorithm described in connection with the embodiments disclosed herein may be embodied directly in hardware, in one or more software modules (also referred to herein as computer-readable code portions) executed by a processor or processing device and configured for performing certain functions, or in a combination of the two. A software module may reside in RAM memory, flash memory, ROM memory, EPROM memory, EEPROM memory, registers, a hard disk, a removable disk, a CD-ROM, or any other form of non-transitory storage medium known in the art. A typical storage medium may be coupled to the processing device, such that the processing device can read information from, and write information to, the storage medium. In the alternative, the storage medium may be integral to the processing device. Further, in some embodiments, the processing device and the storage medium may reside in an Application Specific Integrated Circuit (ASIC). In the alternative, the processing device and the storage medium may reside as discrete components in a computing device. Additionally, in some embodiments, the events and/or actions of a method or algorithm may reside as one or any combination or set of codes or code portions and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions, code, or code portions on a computer-readable medium. Computer-readable media includes both non-transitory computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Thus, systems, methods, and computer program products are described herein that provide for testing regression and compatibility of new or upgraded software and associated hardware.

Introduction of new or upgraded software to a production or an operation environment of an enterprise network requires testing regression and compatibility of the software. Such testing involves installing the software, manually validating entries created or modified with the software being installed, uninstalling the software, and manually validating again the entries to confirm they are reset properly. The testing performed is time-consuming and laborious, especially in the stage of manual validation, and especially when the testing need to be conducted in multiple domains and on various computer platforms. Accordingly, it would be desirable that regression and compatibility testing on new or upgraded software can be done effectively and in a complete automated manner. Some embodiments disclosed herein arise, in part, from the realization that a system can advantageously be configured to test regression and compatibility of new or upgraded software in a completely automated way. Such embodiments enable a user to install, uninstall and validate entries associated with the installation or uninstallation without any manual effort. Such embodiments also enable a user to check and view information related to the regression and compatibility test fast and easily.

Referring now to FIG. 1, a block diagram of a system environment 100 is provided, which includes at least one compatibility testing system 110, owned or administrated by a financial institute. The compatibility testing system 110 is constructed for testing regression and compatibility of new or upgraded software with other software and associated hardware. The system environment 100 further includes at least one user computer system 120, at least one virtual computer system 130, at least one other entity system 140, a network 150, and a user 160, all in communication with one another through the network 150. It should be understood that the when describing compatibility this may represent compatibility and regression testing (e.g., compatibility testing system 110 may be compatibility and regression testing system 110); however compatibility may only be used for brevity.

A "system environment," as used herein, may refer to any information technology platform of an enterprise (e.g., a national or multi-national corporation), and may include a multitude of servers, machines, mainframes, personal computers, network devices, front and back end systems, database systems and/or the like.

A "financial institution" may refer to any organization in the business of moving, investing or lending money, dealing in financial instruments, or providing financial services. For example, a financial institution may be a commercial bank, federal and state savings bank, savings and loan association, credit union, an investment company, an insurance company, or the like.

"Regression testing" may refer to a type of software testing that ensures that any changes, such as enhancements, updates, patches and/or fixes on existing software, do not introduce new faults or affect other parts of the software, and that existing functional and non-functional areas of a system still work after the changes have been made to them. "Compatibility testing" may refer to a type of software testing that evaluates and confirms new or upgraded software's compatibility with existing software and associated hardware in a computing environment that the new or upgraded software will be introduced to.

As used herein, the terms "new and/or upgraded software" and "proposed software" are interchangeable. They include, but are not limited to, new Operating Systems (OS), upgraded versions of an existing OS, new or advanced web browsers, improved anti-virus scanners, security updates, patches and/or fixes on existing software, and the like.

In the embodiment shown in FIG. 1, the compatibility testing system 110 includes a communication device 112, at least one processing device 114 and at least one memory device 116. The memory device 116 includes computer readable instructions 118 including a compatibility testing application 117, and a datastore 119. The processing device 114 is operatively coupled to the memory device 116 and configured to execute the compatibility testing application 117 embedded in the computer readable instructions 118. The datastore 119 may contain regression and compatibility testing results and other related information. The compatibility testing system 110 can be managed and operated by any person or team associated with the financial institute (e.g., a quality assurance team, which is responsible for testing proposed software before the software is deployed to a production or service or commercialization environment). The compatibility testing system 110 may be located at a facility associated with the financial institute or remotely from a facility associated with the financial institute.

The processing device 114 includes circuitry for executing the functions of the compatibility testing system 110. The processing device 114 may include a digital signal processor device, a microprocessor device, analog-to-digital converters, digital-to-analog converters, and other support circuits. Control and signal processing functions of the processing device 114 may be allocated between these devices according to their respective capabilities. The processing device 114 may also include functionality to operate other software programs based on computer-executable program code portions thereof, which may be stored, along with the compatibility testing application 117, on the memory device 116.

The processing device 114 is operatively coupled to the communication device 112, and the memory device 116. The processing device 114 uses the communication device 112 to communicate with the network 150 and other devices on the network 150, such as, but not limited to, the user computer systems 120, the virtual computer systems 130, the other entity systems 140, and/or other systems. As such, the communication device 112 generally comprises a modem, server, or other device for communicating with other devices on the network 150 and/or a keypad, keyboard, touchscreen, touchpad, display, microphone, mouse, joystick, other pointer device, button, soft key, and/or other input and/or output device(s) for communicating with the user 4. The communication device 122 of the user computer systems 120 and the communication device 132 of the virtual computer systems 130 may be similarly configured to the communication device 112 of the compatibility testing systems 110.

The memory device 116, as described herein, contains computer readable instructions 118 that includes a compatibility testing application 117, and a datastore 119. In some embodiments, the memory device 116 includes volatile memory, such as RAM having a cache area for the temporary storage of information. The memory device 116 may also include non-volatile memory that may be embedded and/or removable. The non-volatile memory may additionally or alternatively include an Electrically Erasable Programmable Read-Only Memory (EEPROM), flash memory, and/or the like. The memory device 116 may store any information and data that are used and administrated by the compatibility testing system 110 to implement the functions thereof.

It will be understood that the compatibility testing system 110 may be configured to implement one or more of the various user interfaces and/or process flow described herein. It will also be understood that, in some embodiments, the memory device 116 includes other applications. It will also be understood that, in some embodiments, the compatibility testing system 110 is configured to communicate with third-party systems for purpose of testing.

The user computer system 120 can be a personal computer, electronic notebook or any computing device that has networking capability and is in communication with the compatibility testing system 110 through the network 150. In some embodiments, the user computer system 120 includes a communication device 122, at least one processing device 124 and at least one memory device 126 that includes computer readable instructions 128 including a web browser and/or application 127, and a datastore 129. The user computer system 120 is operated and managed by the user 160. A "user," as used herein, may refer to any person or organization, associated with a financial institute, who has one or more network computers or devices that are likely affected by proposed software, for example, an employee, a manager or a product team of the financial institute. The network computers or devices may join in different domains, controlled by the financial institute, and of various platform types.

The virtual computer system 130, as shown in FIG. 1, is a controlled test computer for testing any proposed software, requested by the user 160. A "virtual computer system," as used herein, generally refers to a computer system that is dedicated to testing regression and compatibility of new or upgraded software, and that emulates a real production environment and tests new or upgraded software before the software is released to the real production environment. In certain embodiments, a "virtual computer system" may also refer to a generic computer having virtualization software stored thereon. "Virtualization software" may refer to a collection of software programs that create a virtual environment on a host computer, for example, creating a guest OS on top of a host computer that runs a different OS.

The virtual computer system 130 includes a communication device 132, at least one processing device 134 and at least one memory device 136. The memory device 136 includes computer readable instructions 138 that may include various software applications 137 for assisting testing and/or other software with which the compatibility of proposed software is to be tested. A datastore 139 is also included in the memory device 136.

The other entity system 140 can be any computerized apparatus controlled or operated by an entity other than the financial institute and capable of communicating with other systems on or through the network 150. An "entity," as used herein, refers to any business or non-business units, including companies that produce and/or provide goods and/or services, companies that sell, offer for sale, distribute, trade, and/or otherwise deal in goods and/or services, government sponsored sectors, or government funded institutes, projects, services, and so on. As illustrated in FIG. 1, the other entity system 140 includes a communication device, at least one processing device and at least one memory device. The memory device includes computer readable instructions that may include various applications for assisting testing and/or other software with which the compatibility of proposed software is to be tested. A datastore may also be included in the memory device. The other entity system 140 may be a source of supply for new or upgraded software or information related to software to be tested, or a third-party service offering tips, advices, tools, and the like, related to regression and compatibility testing.

The compatibility testing system 110, user computer system 120, virtual computer system 130, and other entity system 140 are each operatively connected to the network 150 and in communication with one another therethrough. The network 150 can include various networking interfaces, such as a local area network (LAN), a wide area network (WAN), a global area network (GAN), such as Internet, or a hybrid thereof. The network 450 may be secure or unsecure and may also include wireless and/or wireline and/or optical interconnection technology. Each of the user computer systems 120, the virtual computer systems 130, and the other entity systems 140, may all be similar or the same devices as described above with respect to the compatibility testing system 110.

In some embodiments, the user 160 sends, via the web browser and/or application 127 on the user computer system 120, a request to the compatibility testing system 110 for testing the regression and compatibility of proposed software with other software and associated hardware.

Upon receipt of the user request, the compatibility testing system 110 will first install the proposed software onto the virtual 28 computer system 130, then present a verification interface to the user 160 for validation of various entries to determine if the proposed software passed the regression and compatibility test. After validation of the installed software, the proposed software is uninstalled and the compatibility testing system 110 checks if the virtual computer system 130 can restore or reset successfully. In some embodiments, if the proposed software has been installed on the virtual computer system 130 before the user's request is received, the compatibility testing system 110 will go straight to present a verification interface to the user 160, for validating entries created or modified with the installation.

In some embodiments, the verification interface is part of the compatibility testing application 117, which is a server-side application built on the compatibility testing system 110 and can be invoked by executing the compatibility testing application 117. In some embodiments, the verification interface can be installed on the user computer system 120, as a client-side application embedded in the computer readable instructions 128, and can be launched, for example, through the web browser and/or application 127 that communicates with the compatibility testing system 110. A "server-side application" generally means that the application runs on a server, which, in the present case, is the compatibility testing system 110; while a "client-side application" generally refers to an application stored and executed on a client's machine, which, in the present case, is the user computer system 120. In other embodiments of the invention the compatibility testing application 17 may have portions that are both server-side and client-side with may be stored on the user computer systems 120.

In some embodiments, the verification interface is a graphic user interface (GUI), which enables a user to interact with electronic devices through direct manipulation of graphical elements on the GUI. The graphic elements include, but are not limited to, checkboxes, buttons, radio buttons, dropdown lists, list boxes, text fields, menu bars, and the like. In some embodiments, the verification interface may be an electronic communication interface, which can accommodate one or more input and/or output devices, such as display screens and/or speakers, keys, dials, levers, directional pads, joysticks, accelerometers, controllers, microphones, touchpads, touchscreens, scanners, motion detectors, cameras, and/or the like. In certain embodiments, the verification interface may be a web-based interface which enables a user to communicate with one or more servers or applications thereon, through a web browser. In other embodiments the verification interface may be an application or a portion of an application that is downloaded onto one or more systems to enable a user to communicate the one or more servers and/or application thereon, through the application. In some implementations, the verification interface includes a number of validation functions for validating entries that are created or modified with the proposed software being installed. The validation functions include, by way of example, a registry key validation function, a log file validation function, an ARP validation function and a dependency validation function. The registry key validation function is to determine if a registry key associated with the proposed software is generated or reset upon installation or uninstallation of the proposed software. The log file validation function is to check the contents of a log file containing the sequence of the installation or uninstallation. The ARP validation function is to confirm if an ARP entry corresponding to the proposed software is created or removed upon the installation or uninstallation. And the dependency validation function is to check if the proposed software has prerequisite or post requisite software that has been installed along with installation of the proposed software.

The compatibility testing system 110, after it receives an indication from the user 160 that one or more of the validation functions have been selected, automatically determines if entries corresponding to the selected validation functions are created, updated or successful with the proposed software being installed or uninstalled. The compatibility testing system 110 then presents to the user 160, via the user computer system 120, an indication of success of the validation of the entries.

In some implementations, the verification interface of the compatibility testing application 117 includes an open record function through which the user 160 can retrieve the information about the proposed software (e.g., the version number, the software type, and the like) from a data source. In some implementations, the verification interface may also include a purpose function, through which the user 160 can extract, from the same data source, the purpose of the proposed software. The verification interface may further include an upgrade check function that enables the user 160 to check a previous software version registry key to determine if the previous software version was installed before the proposed software was installed. In certain implementations, the verification interface includes a shortcut test function through which the user 160 can view a default path of the proposed software shortcut. In further implementations, the verification interface may encompass an installation summary function, by which the user 160 can view the testing results for the proposed software.

In some implementations, the verification interface is utilized to test both the installation and uninstallation of the proposed software in multiple domains and on various platforms.

FIG. 2 illustrates a general process flow 200 for testing regression and compatibility of proposed software with other software and associated hardware. The process 200 can be executed by a controlled test system in a system environment, for example, by the compatibility testing system 110 in the system environment 100, as shown in FIG. 1.

The process 200 includes multiple steps, which all may be performed via a processing device through a financial institute system that may enable a user 160 or team of users 160 to test the proposed software. The process 200 starts with step 210 to receive an indication from a user to install the proposed software on a virtual computer system, which can be either a system that emulates a real production environment or a generic computer system having virtualization software installed thereon. Upon installation of the proposed software, the process 200 progresses to step 220 to allow the user to access a compatibility testing application that may be built on one or more server computer systems (e.g., on the compatibility testing system 110 of FIG. 1) or on one or more other computer systems that can be accessed by the user 160.

Once the user 160 has obtained access to the compatibility testing application, the process 200 advances to step 230 to allow the user to utilize the compatibility testing application to check the installation of the proposed software, including validation of entries that are created or modified with the proposed software being installed. The entries that may be validated include, but are not limited to, a registry entry, a log file, an ARP entry, dependencies of the proposed software and/or the like. In certain embodiments, step 230 further includes presenting to the user a verification interface, wherein the verification interface has various validation functions built thereon, including a registry key validation function, a log file validation function, an ARP validation function and a dependency validation function. When the one or more validation functions are selected, the process 200 advances to step 240 to determine if the proposed software installation compatibility testing is successful and provide an indication to the user.

Upon completion of validation of the entries for the installation, the process 200 continues on to step 250 to receive an indication from the user to uninstall the proposed software from the virtual computer system. After the proposed software has been uninstalled, the process 200 progresses to step 260 to allow the user to access the compatibility testing application again for validation purposes. Once the user has access to the compatibility testing application, the process 200 advances to step 270 to allow the user to utilize the compatibility testing application to check the uninstallation of the proposed software, including validation of entries that are removed or reset along with the proposed software being uninstalled. Again, the entries that may be validated include, but are not limited to, a registry entry, a log file, an ARP entry, dependencies of the proposed software, and/or the like. In certain embodiments, step 270 further includes presenting to the user a verification interface, wherein the verification interface has various validation functions built therein, including a registry key validation function, a log file validation function, an ARP validation function and a dependency validation function for the uninstalled application. When the one or more validation functions are selected, the process 200 advances to step 280 to determine if the proposed software uninstallation compatibility testing is successful and provide an indication to the user.

Turning now to FIG. 3, which provides a more detailed process flow 300 for an embodiment of the invention for testing regression and compatibility of proposed software. The process 300 starts with step 302 to receive an indication from a user to install or uninstall the proposed software onto or from a virtual computer system. The process 300 then moves to step 304 to allow the user to access a compatibility testing application and to step 306 to receive an indication from the user to test the compatibility of the proposed software. For example, the user may enter identification characters (e.g., numbers, characters, or the like, or combinations thereof) assigned to the installation or uninstallation of the proposed software on a virtual computer system. In other embodiments of the invention identification characters may be accessed through a dropdown menu, search function, or the like. The identification characters are associated with the proposed software and all of the files being tested along with the proposed software. For example, when the software is installed on the virtual computer systems 130, or another system, an application may group the files together and associate the files with a unique identification characters. Based on the identification number, when the validation functions are selected the compatibility testing system knows what files to access in order to validate the proposed software.

The process 300 next progresses to step 308 to access software files related to the installed or uninstalled proposed software. For example, when the user enters the identification characters into the verification interface, the compatibility testing application 117 access the software files associated with the identification characters. Once the files are accessed, the compatibility testing application 117 may populate and fields that need populating within the verification interface, such as the registry key 418 or the log file 422 (e.g., the file path). The verification interface 400, as previously discussed, may also have multiple functions assembled therein, including an open record function, a purpose function, a registry key validation function, a log file validation function, an ARP validation function, a dependency validation function, a check upgrade function, a shortcut test function and a summary function.

The process 300 moves to step 310 to receive a selection of an open record function, which allows the user to extract the information about the proposed software from a data source (e.g., the version number, the software type, and the like). In some embodiments, the compatibility testing system 110 extracts the data. The data source may be the virtual computer systems 130 on which the software has been installed. In some cases, the data source may be an in-house data archive that tracks and archives new and/or updated software from different vendors. In some cases, the data source may be a third-party database having this sort of information stored therein. In one embodiment, the data source is an Application Lifecycle Management (ALM) application. The extracted information may include the software version, the packaging group of the software, and the package type of the software. This information may be used by the compatibility testing system to populate data fields on an interface, as described in FIG. 4.

The process 300 then moves to step 312 to receive a selection of a purpose function, which allows the user to view the purpose of the proposed software, which may be extracted from the same data source. The purpose of the software may be automatically captured from the software itself, or may be entered by a user when the software is being installed or uninstalled, such that subsequent users validating the software have an idea of the purpose and function of the software while it is being validated.

The process 300 advances to step 314 to receive a selection of the registry key validation function, access the registry key files, and provide to the user an indication of the validation of the registry key. The registry key validation is utilized to determine if the registry entries exist and they contain the correct type of information for the installed or uninstalled software. The registry key validation system checks the install status and the uninstall status of the proposed software. The system can accomplish this task by checking the proposed software, its dependencies, and its prerequisites to determine whether this proposed software will adversely affect (or be adversely affected by) the related software due to the installation or uninstallation of the proposed software. In some embodiments, the system checks the actual registry values of certain elements within the registry. These elements include "Build," "Version," "Installation Status," and the like. For example, the system may inspect the actual registry value of the "Installation Status" element, and upon determining that the value is "1," reporting that the proposed software has been installed. Additionally, when the system determines that the "Installation Status" value is "3," the system can report that the software has been uninstalled.

The process 300 then progresses to step 316 to receive a selection of the log file validation function, access the log file, and provide to the user an indication of the validation of the log file. The log file validation is utilized to determine if the log file has the information indicating a successful installation or uninstallation of the proposed software. The log file validation function searches the log file for one or more predefined patterns within the coding. For example, the system may be set up such that if it finds a certain word within the log file, the system may check other files within the database to determine whether they contain the same word, or whether the other file will push out an error code based on the inclusion of the certain word in the log file of the proposed software. More specifically, the system may inspect the log file for "Error.Log." Upon finding "Error-.Log," the system will check for a second file within the same folder and determine whether that file is empty or not. If the second file is not empty, then the system may return a report that log file validation was not successful. However, if the second file is empty, then the system may move on to search the log files for "MainEngineThread is returning 0" and "Successful" words. Upon finding these words, the system may return a report that the log file validation test is successful The process 300 then moves to step 318 to receive a selection of the ARP validation function, access the proposed software files, and provides to the user an indication if an ARP entry for the proposed software is found. Specifically, the compatibility testing application 117 will access the program and features or the installed update files of the virtual computer system and determine if an APR entry or updated APR entry exists in these locations for the proposed software being installed or uninstalled.

The process 300 next progresses to step 320 to receive a selection of the dependency validation function, access the proposed software files, and provide to the user an indication if required dependencies exist. Dependent applications are either the prerequisite or post requisite of the application. As used herein, prerequisites are the files that need to be installed prior to the proposed software, in order for the proposed software to operate effectively. As such, these prerequisite files are sometimes called "child" applications, or "dependencies." The process includes checking for these prerequisites and post requisites for the new or proposed software application to identify the prerequisites and post requisites as well as to notify the user of any errors or potential errors based on the file structure, application type, network connection, and other issues affecting the relationship between the prerequisites, post requisites, and the proposed software application.

The process 300 continues on to step 322 to receive a selection of the check upgrade function, through which the system can check if a previous version of the proposed software was installed prior to the installation of the proposed software. Step 322 accesses the registry key of a previous software version (if any) and provides to the user an indication if any previous versions were properly installed. The compatibility testing system can check functional, structural, and connectivity aspects of a prior version of the proposed software to determine whether that previous version of the proposed software is properly configured to be upgraded with the proposed software or not.

The process 300 progresses to step 324 to receive a selection of the shortcut test function, access the default path(s) of the proposed software shortcut(s), and provide to the user an indication if the default path(s) is found. These shortcuts may be found on a drive of the computer or embedded within another application on the same server.

The process 300 then progresses to step 326 to receive a selection of summary function, which allows the user to view a summary file having the results for testing of the proposed software. Step 326 accesses the proposed software summary file and provides to the user an indication if the testing success. Such reports may provide the results of the compatibility tests to the user in a manageable format for review, maintenance, and archival purposes. For example, the compatibility system may display the results of the validation test of the registry for the proposed software, the validation test results for the log file of the proposed software, and the results for the ARP, dependencies, upgrades, and shortcut tests for the proposed software. Additionally, the details, the purpose and function, the version, the packaging group, and the package type of the proposed software may be included in the summary report.

The process 300 described in FIG. 3 may then be repeated for new software products. Additionally, the process 300 may run periodically to ensure that every software application remains compatible with the other applications on the server or connected to the server via the network 150. Additionally, the compatibility testing system 110 may continuously monitor one or more software applications for changes in format, dependencies, registry keys, log files, and the like. When the compatibility testing system 110 detects a change, the compatibility testing system 110 may automatically run each of the diagnostic tests in the process 300 and provide the results in the summary.

The systems described herein provide substantial benefits to users, relative to manual review, including a significant reduction in time to validate and test new software applications, as well as to reduce the possibility for errors in the validation and testing processes. Current embodiments of the system reduce the time it takes to validate and test a new software product by about 35%. Additionally, the automated nature of the systems embodied herein remove human error from key aspects of software validation and testing procedures. This risk reduction is extremely beneficial for large, complex software applications that are integral for the user's operation of computer system.

FIG. 4 is an example user interfaces for testing regression and compatibility of proposed software and associated hardware. The general user interface 400 used in these Figures comprises a display with an ALM number section 402, a "Get Details" button 404, a "Clear" button 406, and an "Open Record" button 408. The user interface 400 also displays a software version section 410, a packaging group section 412, a packaging type section 414, and a "Purpose and Function" button 416. Additionally, the display of the user interface 400 includes a registry key section 418, a registry validation button 420, a log file section 422, and a log file validation button 424. Finally, the display of the user interface 400 includes a "Check ARP" button 426, a "Show Dependencies" button 428, a "Check Upgrade" button 430, a "Short Cuts" button 432, and a "Copy Summary" button 434.

FIG. 4 is an overall user interface 400 that includes different selection buttons and text fields, through which a user can view various information associated with the proposed software and validate entries associated with installation or/and uninstallation of the proposed software. The various information associated with the proposed software includes general information about the proposed software, such as the version number and type of the software, the purpose of the proposed software, the registry key of a previous version of the proposed software, a default path of the proposed software shortcut, testing results of the proposed software, and the like. Validation of entries associated with installation or uninstallation of the proposed software includes: determining if a registry key associated with the proposed software is generated or reset upon installation or uninstallation of the proposed software; checking the contents of a log file that shows the sequence and errors (if any) of the installation or uninstallation; confirming if an ARP entry corresponding to the proposed software is created or removed upon the installation or uninstallation; and validating if the proposed software has pre-requisite or post requisite software that has been installed along with installation of the proposed software.

As shown in FIG. 4, a text field associated with the ALM number Section 402 is located on top of the user interface 400 and allows the user to enter an ALM number. As discussed above, the ALM product is a data source having information of new or upgraded software stored therein. Upon entry of the ALM number and selection of the "Open Record" button 408, the system opens the proposed software application and extracts information about used to populate the software version section 410, the packaging group section 412, and the package type section 414. The user may then select the "Purpose and Function" button 416. Upon selection, the system provides a pop-up or other text box to the user describing the purpose and function of the proposed software, along with any other relevant information regarding its proposed implementation. Once the user has entered the ALM number in the ALM number section 402, the user may select the "Get Details" button 404. Upon selection of the "Get Details" button, the system will display general information regarding the proposed software.

The registry key section 418 of the user interface 400 provides the registry path of the proposed software. In some embodiments, the text box in the registry key section 418 may be edited by the user. In some embodiments, the system populates the registry path in the registry key section 418 automatically. The registry validation button 420 is selectable by the user, to prompt the system to conduct a validation test of the registry path. In some embodiments, the registry key section 418 allows the user to open the file associated with the registry path. In such an embodiment, the user may conduct manual checks on the software code and/or make edits to the software code.

The log file section 422 of the user interface 400 provides the log file path for the proposed software. In some embodiments, the text box in the log file section 422 may be edited by the user. In some embodiments, the system populates the log file path in the log file section 422 automatically. The log file validation button 424 is selectable by the user to conduct the log file validation test, based on the log file path in the log file section 422. If the system finds these predefined patterns, then the system may return a "successful" or "valid" message to the user at the user interface 400. As with the registry file section 418, the log file section 422 may allow a user to open the actual log file for manual checking or editing purposes.

By selection of the "Check ARP" button 426, an ARP entry corresponding to the proposed software in the Add-Remove Programs file will be checked. If confirmed, the system will provide a response to the user at the user interface 400 indicating that the proposed software has a valid file in the Add-Remove Program of the operating system. If the ARP entry is not found in the Add-Remove Programs file, or if there is an error associated with the file, then the system will inform the user at the user interface 400 that an issue is present and will provide relevant information related to the issue.

The "Show Dependencies" button 428 of the user interface 400 allows a user to check the prerequisites of the proposed software. In some embodiments, there are no prerequisites to the proposed software. In such embodiments, the "Show Dependencies" button 428 may change color, shape, or other design as an indication that the proposed software does not have dependencies. Additionally, the "Show Dependencies" button may become non-selectable in these circumstances.

The "Check Upgrade" button 430 prompts the system to automatically check for previous versions of the proposed software to make sure that when the proposed software is installed, the previous version will be uninstalled properly. The system may provide feedback to the user at the user interface 400 indicating whether or not the previous version of the proposed software is properly configured to be upgraded in this manner or not. In some embodiments, the system may determine that the proposed software does not have a previous version located in the database. As such, the "Check Upgrade" button 430 may change color, shape, or other physical characteristic to indicate that no previous versions of the proposed software exist on the computer. Additionally, the user interface 400 may cause the "Check Upgrade" button 430 to not be selectable by the user.

The "Short Cuts" button 432 can be selected by the user to cause the system to check every shortcut path for the proposed software that exists on the computer for potential errors or broken links. The system will then respond with an indication as to whether the shortcuts associated with the proposed software are valid or not. As with other buttons on the user interface 400, the "Short Cuts" button 432 may change its physical characteristics and/or become disabled for selection based on the system's determination that no short cuts exist on the current computer.

The "Copy Summary" button 434 can be selected by the user to cause the system to compile each of the tests conducted by the user through the user interface 400 and present the results to the user in a manageable format for review, maintenance, and archival purposes. For example, the output generated by the system in response to the user's selection of the "Copy Summary" button may display the results of the validation test of the registry for the proposed software, the validation test results for the log file of the proposed software, and the results for the ARP, dependencies, upgrades, and shortcut tests for the proposed software. Additionally, the details, the purpose and function, the version, the packaging group, and the package type of the proposed software may be included in the summary report.

Finally, the "Clear" button 406 of the user interface 400 can be selected by the user to cause the system to de-populate every field of the user interface 400 so that the user may begin testing a different proposed software product. In some embodiments, the "Clear" button also archives information regarding the cleared proposed software for later review.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise. In this regard, the term "processor" and "processing device" are terms that are intended to be used interchangeably herein and features and functionality assigned to a processor or processing device of one embodiment are intended to be applicable to or utilized with all or a portion of any other embodiment, unless stated otherwise.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for testing regression and compatibility of software and hardware, the system comprising:
   one or more memory devices having computer readable program code stored thereon; and
   one or more processing devices operatively coupled to the one or more memory devices, wherein the one or more processing devices are configured to execute the computer readable program code to:
     receive a request from a user to install proposed software on a virtual system;
     install the proposed software on the virtual system and present a compatibility testing application to the user based on receiving the request from the user;
     receive an indication from the user to test the regression and the compatibility of the installed proposed software with other software and associated hardware, wherein the indication is a reference to the installed proposed software being changed;
access software files related to the installed proposed software based on the indication received from the user;
present a verification interface associated with the compatibility testing application to the user on a user computer system, wherein the verification interface comprises:
  a registry key and a log file automatically populated in response to accessing software files related to the installed proposed software;
  a registry key validation function associated with the registry key, wherein when the registry key validation function is selected the virtual system automatically determines whether (a) the registry key is generated upon installation of the proposed software or (b) reset upon uninstallation of the proposed software;
  a log file validation function associated with the log file, wherein when the log file validation function is selected the virtual system automatically determines whether the log file includes (a) an indication of no error or (b) an indication of an error;
  an Add or Remove Programs (ARP) validation function, wherein when the ARP validation function is selected the virtual system automatically determines whether (a) an ARP entry is found successfully or (b) no ARP entry is found;
  a dependency validation function, wherein when the dependency validation function is selected the virtual system automatically determines whether (a) the proposed software has pre-requisite or post requisite software that has been successfully installed or (b) the proposed software has pre-requisite or post requisite software that has not been successfully installed;
receive, from the verification interface, a first selection of the registry key validation function, the log file validation function, the ARP validation function, and the dependency validation function;
in response to receiving the first selection, execute the registry key validation function, the log file validation function, the ARP validation function, and the dependency validation function;
determine that the proposed software has been installed successfully based on:
  determining, based on the execution of the registry key validation function, that the registry key is generated upon installation of the proposed software;
  determining, based on the execution of the log file validation function, the indication of no error;
  determining, based on the execution of the ARP validation function, that the ARP entry is found successfully; and
  determining, based on the execution of the dependency validation function, that the installed proposed software has the pre-requisite or the post requisite software that has been successfully installed;
in response to determining that the proposed software has been installed successfully, present an indication of success of the validation of the registry key, the log file, the ARP entry, and the pre-requisite or the post requisite software to the user on the user computer system;
receive a second request from the user to uninstall the installed proposed software from the virtual system;
uninstall the proposed software and present the compatibility testing application to the user on the user computer system based on receiving the second request from the user;
present the verification interface to the user on the user computer system;
receive, from the verification interface, a second selection of the registry key validation function, the log file validation function, the ARP validation function, and the dependency validation function;
determine that the proposed software has been uninstalled successfully based on:
  determining, based on the execution of the registry key validation function, that the registry key is reset upon installation of the proposed software;
  determining, based on the execution of the log file validation function, the indication of no error;
  determining, based on the execution of the ARP validation function, that the ARP entry is found successfully; and
  determining, based on the execution of the dependency validation function, that the proposed software has the pre-requisite or the post requisite software that has been successfully installed;
in response to determining that the proposed software has been uninstalled successfully, present a second indication of success of the validation of the registry key, the log file, and the ARP entry to the user on the user computing system.

2. The system of claim 1, wherein the verification interface further comprises:
an open record function, wherein when the open record function is selected the system receives information about the proposed software, wherein the information comprises a version number and package type of the proposed software.

3. The system of claim 1, wherein the verification interface further comprises:
a purpose function, wherein when the purpose function is selected the virtual system receives an indication of a purpose of the proposed software.

4. The system of claim 1, wherein the verification interface further comprises:
an upgrade check function, wherein when the upgrade check function is selected the virtual system checks a previous software version registry key to determine if a previous software version was installed before the proposed software was installed.

5. The system of claim 1, wherein the verification interface further comprises:
a shortcut test function, wherein when the shortcut test function is selected the virtual system determines and displays a default path of a shortcut of the proposed software.

6. The system of claim 1, wherein the verification interface is utilized to test both the installation and uninstallation of the proposed software on multiple domains and on multiple platforms.

7. A computer program product for testing regression and compatibility of software and hardware, the computer program product comprising a non-transitory computer readable medium comprising computer readable instructions, the instructions comprising instructions for:
receive a request from a user to install proposed software on a virtual system;

install the proposed software on the virtual system and present a compatibility testing application to the user based on receiving the request from the user;
receiving an indication from the user to test the regression and the compatibility of the installed proposed software with other software and associated hardware, wherein the indication is a reference to the installed proposed software being changed;
accessing software files related to the installed proposed software based on the indication received from the user;
presenting a verification interface associated with the compatibility testing application to the user on a user computer system, wherein the verification interface comprises:
  a registry key and a log file automatically populated in response to accessing software files related to the installed proposed software;
  a registry key validation function associated with the registry key, wherein when the registry key validation function is selected the virtual system automatically determines whether (a) the registry key is generated upon installation of the proposed software or (b) reset upon uninstallation of the proposed software;
  a log file validation function associated with the log file, wherein when the log file validation function is selected the virtual system automatically determines whether the log file includes (a) an indication of no error or (b) an indication of an error;
  an Add or Remove Programs (ARP) validation function, wherein when the ARP validation function is selected the virtual system automatically determines whether (a) an ARP entry is found successfully or (b) no ARP entry is found;
  a dependency validation function, wherein when the dependency validation function is selected the virtual system automatically determines whether (a) the proposed software has pre-requisite or post requisite software that has been successfully installed along with the proposed software or (b) the proposed software has pre-requisite or post requisite software that has not been successfully installed;
receiving, from the verification interface, a first selection of the registry key validation function, the log file validation function, the ARP validation function, and the dependency validation function;
in response to receiving the first selection, executing the registry key validation function, the log file validation function, the ARP validation function, and the dependency validation function;
determining that the proposed software has been installed successfully based on:
  determining, based on the execution of the registry key validation function, that the registry key is generated upon installation of the proposed software;
  determining, based on the execution of the log file validation function, the indication of no error;
  determining, based on the execution of the ARP validation function, that the ARP entry is found successfully; and
  determining, based on the execution of the dependency validation function, that the installed proposed software has the pre-requisite or the post requisite software that has been successfully installed;
in response to determining that the proposed software has been installed successfully, presenting an indication of success of the validation of the registry key, the log file, the ARP entry, and the pre-requisite or the post requisite software to the user on the user computer system;
receiving a second request from the user to uninstall the installed proposed software from the virtual system;
uninstalling the proposed software and presenting the compatibility testing application to the user on the user computer system based on receiving the second request from the user;
presenting the verification interface to the user on the user computer system;
receiving, from the verification interface, a second selection of the registry key validation function, the log file validation function, the ARP validation function, and the dependency validation function;
determining that the proposed software has been uninstalled successfully based on:
  determining, based on the execution of the registry key validation function, that the registry key is reset upon installation of the proposed software;
  determining, based on the execution of the log file validation function, the indication of no error;
  determining, based on the execution of the ARP validation function, that the ARP entry is found successfully; and
  determining, based on the execution of the dependency validation function, that the proposed software has the pre-requisite or the post requisite software that has been successfully installed;
in response to determining that the proposed software has been uninstalled successfully, presenting a second indication of success of the validation of the registry key, the log file, and the ARP entry to the user on the user computing system.

8. The computer program product of claim 7, wherein verification interface further comprises:
  an upgrade check function, wherein when the upgrade check function is selected the virtual system checks a previous software version registry key to determine if a previous software version was installed before the proposed software was installed.

9. The computer program product of claim 7, wherein the verification interface further comprises:
  a shortcut test function, wherein when the shortcut test function is selected the virtual system determines and displays a default path of a shortcut of the proposed software.

10. The computer program product of claim 7, wherein the verification interface is utilized to test both the installation and uninstallation of the proposed software on multiple domains and on multiple platforms.

11. A computer implemented method for testing regression and compatibility of software and hardware, said computer implemented method comprising:
  receiving, via a processing device, a request from a user to install proposed software on a virtual system;
  installing, via a processing device, the proposed software on the virtual system and present a compatibility testing application to the user based on receiving the request from the user;
  receiving, via a processing device, an indication from the user to test the regression and the compatibility of the installed proposed software with other software and associated hardware, wherein the indication is a reference to the installed proposed software being change;

accessing, via a processing device, software files related to the installed proposed software based on the indication received from the user;

presenting, via a processing device, a verification interface associated with the compatibility testing application to the user on a user computer system, wherein the verification interface comprises:

a registry key and a log file automatically populated in response to accessing software files related to the installed proposed software;

a registry key validation function associated with the registry key, wherein when the registry key validation function is selected the virtual system automatically determines whether (a) the registry key is generated upon installation of the proposed software or (b) reset upon uninstallation of the proposed software;

a log file validation function associated with the log file, wherein when the log file validation function is selected the virtual system automatically determines whether the log file includes (a) an indication of no error or (b) an indication of an error;

an Add or Remove Programs (ARP) validation function, wherein when the ARP validation function is selected the virtual system automatically determines whether (a) an ARP entry is found successfully or (b) no ARP entry is found;

a dependency validation function, wherein when the dependency validation function is selected the virtual system automatically determines whether (a) the proposed software has pre-requisite or post requisite software that has been successfully installed or (b) the proposed software has pre-requisite or post requisite software that has not been successfully installed;

receiving from the verification interface, via a processing device, a first selection of one or more of the registry key validation function, the log file validation function, the ARP validation function, and the dependency validation function;

in response to receiving the first selection, executing, via a processing device, the registry key validation function, the log file validation function, the ARP validation function, and the dependency validation function;

determining, via a processing device, that the proposed software has been installed successfully based on:

determining, based on the execution of the registry key validation function, that the registry key is generated upon installation of the proposed software;

determining, based on the execution of the log file validation function, the indication of no error;

determining, based on the execution of the ARP validation function, that the ARP entry is found successfully; and determining, based on the execution of the dependency validation function, that the installed proposed software has the pre-requisite or the post requisite software that has been successfully installed;

in response to determining that the proposed software has been installed successfully, presenting, via a processing device, an indication of success of the validation of the registry key, the log file, the ARP entry, and the pre-requisite or the post requisite software to the user on the user computer system;

receiving, via a processing device, a second request from the user to uninstall the installed proposed software from the virtual system;

uninstalling, via a processing device, the proposed software and presenting, via a processing device, the compatibility testing application to the user on the user computer system based on receiving the second request from the user;

presenting, via a processing device, the verification interface to the user on the user computer system;

receiving from the verification interface, via a processing device, a second selection of the registry key validation function, the log file validation function, the ARP validation function, and the dependency validation function;

determining, via a processing device, that the proposed software has been uninstalled successfully based on:

determining, based on the execution of the registry key validation function, that the registry key is reset upon installation of the proposed software;

determining, based on the execution of the log file validation function, the indication of no error;

determining, based on the execution of the ARP validation function, that the ARP entry is found successfully; and determining, based on the execution of the dependency validation function, that the proposed software has the pre-requisite or the post requisite software that has been successfully installed;

in response to determining that the proposed software has been uninstalled successfully, presenting, via a processing device, a second indication of success of the validation of the registry key, the log file, and the ARP entry to the user on the user computing system.

12. The computer implemented method of claim 11, wherein the verification interface further comprises:

an upgrade check function, wherein when the upgrade check function is selected the virtual system checks a previous software version registry key to determine if a previous software version was installed before the proposed software was installed.

13. The computer implemented method of claim 11, wherein the verification interface further comprises:

a shortcut test function, wherein when the shortcut test function is selected the virtual system determines and displays a default path of a shortcut of the proposed software.

14. The computer implemented method of claim 11, wherein the verification interface is utilized to test both the installation and uninstallation of the proposed software on multiple domains and on multiple platforms.

* * * * *